(12) United States Patent
Bates

(10) Patent No.: US 8,815,450 B1
(45) Date of Patent: Aug. 26, 2014

(54) LOW VOLTAGE THIN FILM BATTERIES

(75) Inventor: John B. Bates, Oak Ridge, TN (US)

(73) Assignee: Oak Ridge Micro-Energy, Inc., Oak Ridge, TN (US)

( * ) Notice: Subject to any disclaimer, the term of this patent is extended or adjusted under 35 U.S.C. 154(b) by 1491 days.

(21) Appl. No.: 12/020,774

(22) Filed: Jan. 28, 2008

(51) Int. Cl.
*H01M 8/00* (2006.01)

(52) U.S. Cl.
USPC .................................. 429/231.95; 429/231.5

(58) Field of Classification Search
USPC ........... 429/318, 231.95, 231.8, 218.1, 231.2, 429/231.5, 224, 231.3; 264/614
See application file for complete search history.

(56) References Cited

U.S. PATENT DOCUMENTS

| | | | |
|---|---|---|---|
| 3,591,417 A * | 7/1971 | Ness et al. | 429/245 |
| 4,983,476 A | 1/1991 | Slane et al. | |
| 5,338,625 A | 8/1994 | Bates et al. | |
| 5,512,147 A | 4/1996 | Bates et al. | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,657,297 A * | 8/1997 | Honda | 368/46 |
| 6,168,884 B1 | 1/2001 | Neudecker et al. | |
| 6,218,049 B1 | 4/2001 | Bates et al. | |
| 6,242,132 B1 | 6/2001 | Neudecker et al. | |
| 6,387,563 B1 | 5/2002 | Bates | |
| 6,818,356 B1 | 11/2004 | Bates | |
| 6,994,933 B1 | 2/2006 | Bates | |
| 7,045,372 B2 | 5/2006 | Ballantine et al. | |
| 2004/0048157 A1 | 3/2004 | Neudecker et al. | |
| 2007/0259271 A1 * | 11/2007 | Nanno et al. | 429/318 |
| 2012/0251867 A1 * | 10/2012 | Krasnov et al. | 429/127 |

OTHER PUBLICATIONS

ENJalbert and Galy, "A Refinement of the Structure of V2O5," Acta. Cryst. vol. C42, pp. 1467-1469, Nov. 1986.
Auborn and Barberio, "Lithium Intercalation Cells Without Metallic Lithium", J. Electrochem. Soc. vol. 134, pp. 638-641, Mar. 1987.
Delmas, Brethes, and Menetrier, "w-LixV2O5—A New Electrode Material for Rechargeable Lithium Batteries," J. Power Surces vol. 34, pp. 113-118 (1991).
Plichta and Behl, "The Rechargeable LixTiS2/LiAl4/Li1-xCoO2 Solid-State Cell", J. Electrochem. Soc. vol. 139, pp. 1509-1513, Jun. 1992.
Scrosati, "Lithium Rocking Chair Batteries", J. Electrochem. Soc. vol. 139, pp. 2276-2781, Oct. 1992.

(Continued)

*Primary Examiner* — Mark F Huff
*Assistant Examiner* — Monique Wills
(74) *Attorney, Agent, or Firm* — Luedeka Neely Group, PC

(57) ABSTRACT

A low-voltage, thin film battery and methods for making a low voltage battery. The battery includes a ceramic substrate having a first surface and a second surface. A cathode current collector is disposed adjacent to at least a portion of the first surface of the substrate. The current collector has a titanium layer and a gold layer. A high temperature annealed cathode is disposed adjacent to at least a portion of the gold cathode current collector and an electrolyte layer disposed adjacent to the annealed cathode. An annealed anode is disposed adjacent to at least a portion of the electrolyte, wherein the anode is electrically insulated from the cathode and the cathode current collectors by the electrolyte. An anode current collector is disposed adjacent to at least a portion of the anode.

20 Claims, 3 Drawing Sheets

(56) References Cited

OTHER PUBLICATIONS

West, Zachau-Christiansen, and Skaarup, "Lithium Insertion in Sputtered Vanadium Oxide Films", Solid State Ionics vol. 57, pp. 41-47 (1992).

Bates, Dudney, Gruzalski, Zuhr, Choudhury, and Luck, "Fabrication and Characterization of Amorphous Lithium Electrolyte Thin Films and Rechargeable Thin Film Batteries" J. Power Sources vol. 43-44, pp. 103—(1993).

Huang, Kavan, Exnar, and Gratzel, "Rocking Chair Lithium Battery Based on Nanocrystalline TiO2 (Anatase)," J. Electrochem. Soc. vol. 149, pp. L142-L144, Sep. 1995.

Baba, Kumagai, Kobayashi, Nakano, and Nishidate, "Fabrication and Electrochemical Characteristics of All-Solid-State Lithium-Ion Batteries Using V2O5 Thin Films for Both Electrodes", Electrochemical and Solid-State Letters, vol. 2, pp. 320-322, Jul. 1999.

Lee, Liu, Tracy, and Benson, "All-Solid-State Rocking Chair Lithium Battery on a Flexible Al Substrate", Electrochemical and Solid-State Letters, vol. 2, pp. 425-427, Sep. 1999.

Baba, Kumagai, Fujita, Ohta, Nishidate, Komaba, Groult, Devilliers, and Kaplan, "Fabrication and Electrochemical Characteristics of All-Solid-State Lithium-Ion Rechargeable Batteries Composed of LiMn2O4 Positive and V2O5 Negative Electrodes", J. Power Sources vol. 97-98, pp. 798-800, 2001.

Huang, Fu, Chu, Liu, and Qin "Characterization of Composite 0.5Ag:V2O5 Thin-Film Electrodes for Lithium-Ion Rocking Chair and All-Solid-State Batteries", Electrochemical and Solid State Letters vol. 7, pp. A180-A184, Jul. 2004.

Leger, Bach, Soudan, and Pereira-Ramos, "Structural, and Electrochemical Properties of w-Li$_x$V2O5 (0.4<x<3) as Rechargeable Cathodic Material for Lithium Batteries," J. Electrochem. Soc. vol. 152, pp. A236-A241, Jan. 2005.

Murphy, Christian, Disalvo, and Waszczak, "Lithium Incorporation by Vanadium Pentoxide", Inorganic Chemistry vol. 18, p. 2800-2803, 1979.

* cited by examiner

LOW VOLTAGE THIN FILM BATTERIES

TECHNICAL FIELD

The disclosure relates to thin film batteries and in particular to improved low-voltage thin film batteries and methods for making low-voltage thin film batteries, such as rechargeable lithium or lithium-ion batteries.

BACKGROUND AND SUMMARY

Thin-film rechargeable batteries have numerous applications in the field of microelectronics. For example, thin-film batteries may provide active or standby power for microelectronic devices and circuits. Active power source applications of thin-film batteries include, for example, implantable medical devices, remote sensors, semiconductor diagnostic wafers, automobile tire sensors, miniature transmitters, active radio frequency identification (RFID) tags, smart cards, and MEMS devices. Standby power source applications of thin-film batteries include non-volatile CMOS-SRAM memory products such as memory chips for computers, sensors, passive RFID tags, and backup power for real time clocks in electronic devices, for example, cellular telephones.

In a battery, a chemical reaction takes place between an anode and cathode by interaction of the anode and cathode through an electrolyte that may be a solid or liquid. Liquid organic electrolytes used in conventional lithium-ion batteries pose safety problems because the electrolytes are flammable and are not tolerant to temperatures above about 130° C. The attractiveness of thin-film, solid state batteries over conventional batteries is that the electrolyte is a solid or non-flowable material rather than a liquid. Solid state, thin-film batteries typically employ glassy ceramic electrolytes. Solid electrolytes are desirable in cells or batteries where liquid electrolytes may be undesirable, such as in implantable medical devices. Preferred solid electrolytes include materials that are amorphous solids with high melting temperatures (greater than about 900° C.), and are electrically insulative and ionically conductive.

The demand to reduce power consumption of electronics is one of the drivers to lower the operating voltages of integrated circuit (IC) components such as processors and non-volatile memory. Presently many components operate at about 2 volts and below. Rechargeable lithium or lithium-ion batteries with oxide based cathodes such as $LiCoO_2$ and metallic lithium, lithium alloy, or carbon anodes typically have a voltage output between 4.2 volts and 3.0 volts. While present thin film lithium-ion batteries can be discharged to zero volts, they essentially provide no operating capacity below about 3.0 volts.

In order to power low-voltage electronics with a conventional thin film lithium ion battery, a voltage regulator circuit is required which wastes battery energy, and occupies additional space, and adds to the heat load of the circuit. For millimeter-sized and smaller devices, this defeats the purpose of using a thin-film micro-battery. The purpose of the disclosure is to provide a thin film battery that delivers most of its capacity between 2.5 volt and 0.5 volts.

With regard to the above, an exemplary embodiment of the disclosure provides an apparatus for use as a low-voltage, thin film battery and methods for making a low voltage battery. The apparatus includes a ceramic substrate having a first surface and a second surface. A cathode current collector is disposed adjacent to at least a portion of the first surface of the substrate. The current collector has a titanium layer and a gold layer. A high temperature annealed cathode is disposed adjacent to at least a portion of the gold cathode current collector and an electrolyte layer disposed adjacent to the annealed cathode. An annealed anode is disposed adjacent to at least a portion of the electrolyte, wherein the anode is electrically insulated from the cathode and the cathode current collectors by the electrolyte. An anode current collector is disposed adjacent to at least a portion of the anode.

Another exemplary embodiment of the disclosure relates to a method for making low-voltage, thin film battery. The method includes depositing a cathode current collector on at least a portion of a first surface of a substrate. The cathode current collector has a titanium layer adjacent to the substrate and a gold layer adjacent to the titanium layer. A cathode film is deposited on at least a portion of the gold film. The cathode film is then annealed in air at a temperature ranging from 750° C. to 800° C. for a period of time ranging from 10 minutes to 30 minutes. An electrolyte layer is then deposited on at least a portion of the annealed cathode. An anode film is deposited on at least a portion of the electrolyte layer, and an anode current collector is deposited on at least a portion of the anode film.

As disclosed herein, the thin film battery has an output voltage between less than 3.0 volts and about 0.0 volts, and typically delivers most of its voltage potential between 2.5 and 0.5 volts. Accordingly, the thin film battery, as described herein, may be used in low voltage circuits without requiring the use of a voltage regulator. Also, the thin film battery, as described herein may be cycled at temperatures above about 100° C. and relatively high currents. For example, the battery may be able to withstand temperatures in excess of about 265° C. thereby enabling assembly of integrated circuits containing the battery using ROHS-compatible solder reflow or surface mount assembly techniques.

BRIEF DESCRIPTION OF THE DRAWINGS

Further advantages of the disclosed embodiments will become apparent by reference to the detailed description when considered in conjunction with the figures, wherein like reference numbers indicate like elements throughout, and wherein.

DETAILED DESCRIPTION OF EXEMPLARY EMBODIMENTS

In a thin film battery, the operating potential is determined by the nature of the cathode and anode. For lithium or lithium-ion batteries, the cell potential at no load is proportional to the difference between the chemical potential of $Li^+$ ions in the cathode and the chemical potential of $Li^+$ ions in the anode. In order to lower battery voltage, it is necessary, therefore, to lower the difference between the chemical potentials of $Li^+$ ions in the cathode and anode. According to the disclosure, one method of lowering cell voltage is to replace a metallic or carbon anode with a lithium intercalation compound that initially contains no lithium such as vanadium pentoxide, $V_2O_5$ or molybdenum disulfide, $MoS_2$. In general, for batteries with oxide-based cathodes such as $LiCoO_2$, oxide-based anodes yield batteries with lower voltages than sulfide-based anodes. Because metallic lithium poses a hazard in liquid electrolyte batteries, the objective in the development of lithium-ion cells has been to avoid the use of a metallic lithium anode yet maintain a high cell potential.

In an exemplary embodiment of the present disclosure there is provided a thin-film rechargeable lithium-ion battery that delivers most of its capacity at potentials from about 2.5 volts to about 0.5 volts, for example, from about 2.2 volts to about 1.0 volt. The lower voltage lithium-ion battery is desirably a solid state battery that may be fabricated by sputter deposition of component films onto a suitable substrate. A hermetic enclosure may be included to protect the battery components from exposure to oxygen and water vapor and to allow for expansion and contraction of the anode upon charging and discharging the battery. A packaged battery as described herein may be able to withstand temperatures in excess of 265° C. thereby enabling its use in integrated circuits using either ROHS-compatible solder reflow or surface mount assembly processes.

Figure 1:
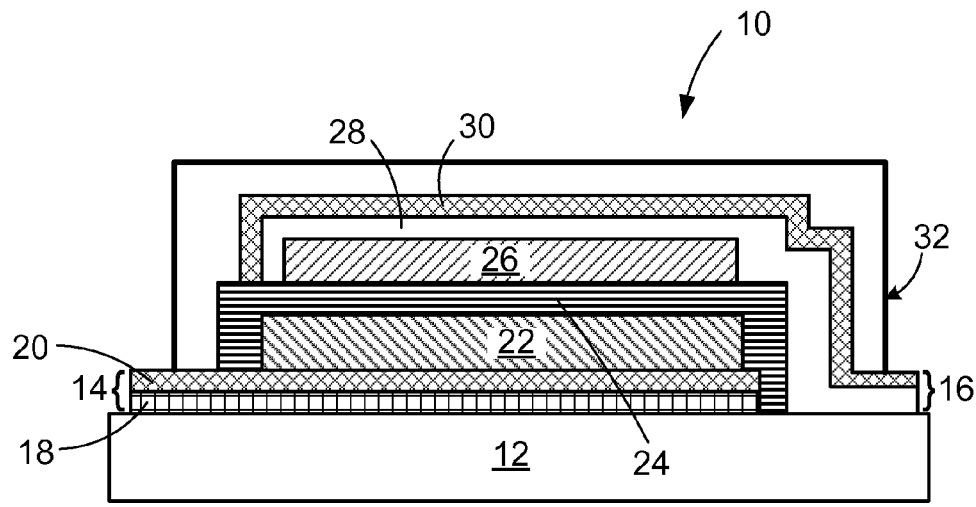
FIG. 1 is a cross-sectional view, not to scale, of a low voltage thin film battery according to the disclosure.

A cross-sectional view of a packaged thin film rechargeable battery 10 according to one embodiment of the disclosure is illustrated in FIG. 1. The packaged battery 10 typically includes a substrate 12 made of an insulating material such as a ceramic, or an organic polymer that can withstand high processing temperatures. In the alternative, the thin film battery components may be applied to an existing semiconductor substrate wherein a cathode current collector of the battery may be provided by a conductive metal layer of a semiconductor circuit. The particular substrate and thickness of the substrate are not particularly critical to the disclosed embodiments. Accordingly, a suitable substrate may be a tape cast alumina having a thickness ranging from about 125 to about 650 micrometers (µm) or more.

The packaged battery 10 contains a cathode current collector 14 and an anode current collector 16 that may be made of a single metal film layer or, more desirably, dual metal conductive films as described in more detail below. The cathode and anode current collectors 14 and 16 are suitably deposited by DC magnetron sputtering of the respective metal films in an argon atmosphere.

When using a ceramic substrate 12, the cathode current collector 14 may be provided by a titanium film 18 having a thickness ranging from about 0.01 to about 0.10 µm and a gold film 20 having a thickness ranging from about 0.1 µm and about 0.3 µm. The titanium film 18 is deposited adjacent to the substrate 12 to provide improved adhesion of the cathode current collector 14 to the substrate 12.

An important component of the battery package is a cathode film 22 that is deposited on the cathode current collector 14 by radio frequency (rf) magnetron sputtering of a cathode target in an argon atmosphere and then the deposited cathode film 22 is annealed. A suitable cathode film for a rechargeable thin film lithium-ion battery according to the disclosure may be selected from $LiCoO_2$ and $Li_2Mn_2O_4$. If the operating temperature of the battery 10 is below about 65° C., the suitable cathode film 22 is $LiCoO_2$. If the battery 10 is required to operate above about 65° C., the most desirable cathode film 22 is $LiMn_2O_4$. The thickness of the cathode film 22 typically ranges from about 1.0 µm to about 5.0 µm.

After depositing the cathode film 22, the film 22 is annealed at an elevated temperature. Since the other components of the battery 10 are deposited after annealing the cathode film 22, the cathode film may be annealed in air at a temperature ranging from about 700° C. to about 850° C. or higher for a period of time ranging from about 5 to about 40 minutes.

An electrolyte film 24 is provided between the cathode film 22 and an anode film 26 to separate the cathode and anode and to provide a high $Li^+$ ion conductivity pathway between the cathode film 22 and anode film 26. The electrolyte film 24 should be chemically stable in contact with the components of the battery 10 at potentials above and below the discharge voltage range of the battery 10. A particularly suitable electrolyte film 24 for a lithium-ion rechargeable battery is an amorphous lithium phosphorus oxynitride film 20 made by sputtering $Li_3PO_4$ in a nitrogen atmosphere onto the cathode film 22 and a portion of the cathode current collector 14 and substrate 12 as shown. During the sputtering step for the electrolyte film 24, coupons of sulfur and/or aluminum may placed around a racetrack of a target for the electrolyte film 24 in order to achieve a desired concentration of S and/or Al ions in the film 24 as described in U.S. Pat. No. 6,818,356, issued Nov. 16, 2004, and U.S. application Ser. No. 10/951,840, filed Sep. 28, 2004, the disclosures of which are incorporated herein by reference. The electrolyte film 24 has a thickness typically ranging from about 0.5 µm to about 2.0 µm.

A consideration in selecting an anode film 26 for a low-voltage thin film battery is that it can be crystallized at a temperature of less than 350° C. in order to avoid reaction with the thin film electrolyte 24 during an anneal step. Annealing the anode film 26 increases the lithium diffusivity in the anode film 26 and lowers cell resistance. The anode film 26 may be selected from selected from the group consisting of $V_2O_5$, $TiS_2$, $MoS_2$, $MoO_{2-x}S_x$, $MoO_3$, and $\omega Li_xV_2O_5$, wherein x is between 0 and 4. For example, a lithium intercalation compound selected from $V_2O_5$ or molybdenum disulfide ($MoS_2$) may be used to provide the anode film 26. As deposited, the anode film 26 does not contain lithium. Upon charging, lithium ions from the cathode film 22 are inserted into the anode film 26. Once lithium is inserted into the anode film 26, the anode film 26 is reactive to oxygen and water vapor because of the high lithium activity.

Unlike conventional thin-film lithium ion batteries that place a lithiated $V_2O_5$ anode film at the bottom of the battery stack, under the electrolyte film 24 to protect the lithiated anode film from air exposure, the anode film 26 in the battery 10 of the disclosure is placed above the electrolyte film 24 near the top of the battery 10. Advantages of placing the anode film 26 near the top of the battery 10 include an ability to anneal the cathode film 22 at an elevated temperature that may be detrimental to the other components of the battery 10, before the other components are deposited. Another advantage of the foregoing construction is that annealing of the cathode film 22 and the anode film 26 lowers the internal cell resistance due to higher lithium diffusion through the annealed cathode and anode films 22 and 26.

After depositing the anode film 26, the anode current collector 16 is deposited on the anode film 26 and a portion of the electrolyte and substrate to provide for electrical connection to the anode film 26 of the battery 10. As with the cathode current collector 14, the anode current collector 16 may be a single metal film or desirably, a dual metal conductive film containing a copper layer 28 adjacent to the anode film 26 having a thickness ranging 0.1 to about 0.5 microns and a gold layer 30 having a thickness ranging from about 0.1 µm to about 0.5 µm.

Deposition of the gold layer 30 over the copper layer 28 of the anode current collector 16 is optional depending on the type of packaging. In the case of a hermetic battery 10 in which a lid of glass or other material is sealed to the substrate 12 with an epoxy that requires curing at elevated temperatures, the optional gold layer 30 may prevent oxidation of the copper layer 28 from oxygen in residual air that might be trapped under the lid.

Desirably, a hermetically sealed packaged battery 10 is provided. Accordingly the packaged battery 10 includes a cover or lid 32 that is sealed to the current collectors 14 and 16 and the substrate 12 using an adhesive such as an epoxy or other adhesive material having suitable barrier properties. The cover 32 and adhesive are disposed over the thin film battery in a manner that allows for expansion of the anode film 26 during a battery charge step. Accordingly, there may be a gap between the cover 32 and the anode current collector 16 ranging from about 20 μm to about 160 μm depending on the thickness of the adhesive. The adhesive desirably circumscribes the thin film battery components and provides a substantially water vapor and air impermeable seal with the cover 32. A method for making a sealed battery 10 according to the exemplary embodiments is disclosed in U.S. Patent Publication No. 2008/0003492, published Jan. 3, 2008, the disclosure of which is incorporated herein by reference.

In another embodiment, a thin film getter may disposed on an interior surface of the cover 32 to further reduce the presence of moisture or air trapped in the packaged battery 10 as described in U.S. Publication No. 2008/0003493, published Jan. 3, 2008, the disclosure of which is incorporated herein by reference. As shown in FIG. 1, the current collectors 14 and 16 extend though the cover 32 for connection to a device or circuit.

In another exemplary embodiment, the cover 32 is relatively thick and is made of a dense material, e.g. glass, ceramic, or metal. Suitable ceramic materials include but are not limited to metal oxides, metal nitrides, metal carbides, borosilicate glasses, and the like, such as $Al_2O_3$, AlN, $SiO_2$, $Si_3N_4$, SiC, and $ZrO_2$. Suitable metal materials include, but are not limited to stainless steel, Al, Ti, and W. For all practical purposes, the cover 32 is substantially impermeable to oxygen, water, and water vapor. The barrier properties of the hermetic 10 are, therefore, determined by the adhesive material.

As described above, a thin film rechargeable lithium-ion battery according to the disclosure may be made with a $V_2O_5$ anode that is subsequently lithiated to $Li_xV_2O_5$ during the initial charge step. The crystalline phases of $Li_xV_2O_5$, with $0 \leq x \leq 3$, have been well characterized from studies of bulk materials, stimulated in part by early development of rechargeable lithium batteries based on $V_2O_5$ cathodes. Crystalline $V_2O_5$ has been reported to have an orthorhombic, Pmmn, structure with cell parameters of a=11.512 angstroms (A), b=3.564 A, and c=4.368 A. On intercalation of lithium into the $V_2O_5$ bulk material, successive orthorhombic $Li_xV_2O_5$ phases may appear as denoted by α, ε, δ, and γ as x changes from 0 to 2. For crystalline thin films, the phase transitions are reversible provided x<2. Insertion of lithium to x≥2 at a potential of ≤2 volts versus Li may induce an irreversible transition to a disordered ω-phase of $Li_xV_2O_5$. It has been reported that $\omega Li_xV_2O_5$ in liquid electrolyte cells may be reversibly cycled over the range of $0.4 \leq x \leq 2.65$.

Thin films of $V_2O_5$ have been deposited using chemical and physical vapor deposition techniques including reactive dc and rf magnetron sputtering of V metal targets in $Ar+O_2$ gas mixtures and by rf magnetron sputtering of $V_2O_5$ targets in Ar and $Ar+O_2$. As-deposited, amorphous $V_2O_5$ films deposited by reactive dc magnetron sputtering were used as the cathode in prior art thin film batteries. The fabrication and properties of thin film lithium cells with crystalline $V_2O_5$ obtained by annealing as-deposited films at temperatures 300° C. to 500° C. in thin film lithium batteries, and the formation and properties of $\omega Li_xV_2O_5$ are summarized below.

Figure 2:
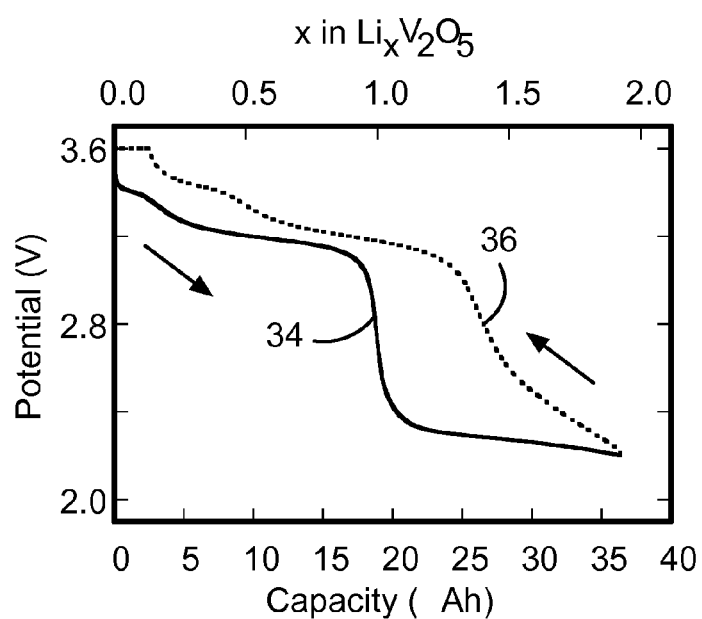
FIGS. 2 and 3 are graphs of voltage potentials versus charge/discharge capacity for prior art thin film batteries containing lithiated anodes.

A discharge-charge cycle between 3.6 volts and 2.2 volts of a $L_1$-$V_2O_5$ thin film battery with a 300° C. annealed cathode is shown in FIG. 2. The lithium composition x in $Li_xV_2O_5$ is based on the measured thickness and density as-deposited $V_2O_5$ films, and the values displayed have an estimated error of about 5%. The maximum lithium insertion was limited to x<2 in order to avoid formation of the w phase. Although the same crystalline phases appear in both half-cycles, there is a gap between the discharge curve 34 and charge curve 36 due to a hystersis in reversing the phase transitions on the charge cycle.

Figure 3:
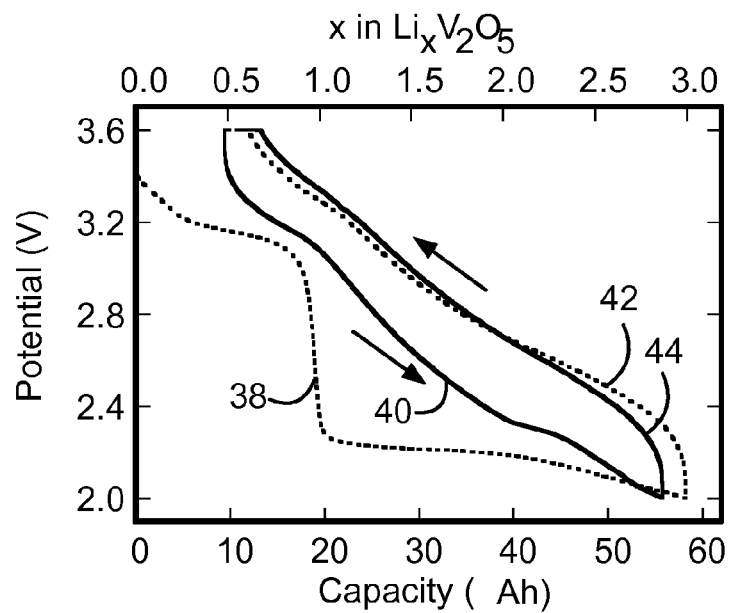

The formation of $\omega Li_xV_2O_5$ in a thin film $L_1$-$V_2O_5$ battery is illustrated in FIG. 3. The first discharge to 2 volts (Curve 38), as shown in equation (1), results in the formation of $\omega Li_xV_2O_5$:

$$3Li + V_2O_5 \rightarrow Li_{3.0}V_2O_5 \qquad (1).$$

On the following charge half-cycle (Curve 42),

$$Li_{3.0}V_2O_5 \rightarrow 2.52Li + Li_{0.48}V_2O_5 \qquad (2a)$$

about 0.48 Li per $V_2O_5$ remains in the cathode at the charging potential of 3.6 volts. In order to extract the maximum amount of lithium according to equation (2a), the charging potential is held fixed at 3.6 volts until the current density decreases to about 1 microampere per square centimeter of cathode area. The inflections evident in the charge curves 42 and 44 and discharge curve 40 in the predominantly w-phase $Li_xV_2O_5$ are due to remnant δ, and γ phases which disappear on continued cycling. On the second discharge half-cycle to 2.0 volts (Curve 40), the quantity of lithium inserted is reduced from the initial discharge step as shown in equation (2b):

$$2.39Li + Li_{0.48}V_2O_5 \rightarrow Li_{2.87}V_2O_5 \qquad (2b)$$

The large capacity loss of about 5% between the first (Curve 38) and second discharge (Curve 40) steps decreases to less than 1% per cycle on the following charge and discharge cycles between 3.6 volts and 2.0 volts.

In view of the foregoing, the optimum cycle life and cell capacity in thin film batteries with $LiCoO_2$ cathodes is achieved when the range of x in $Li_xCoO_2$ is 0.5 to 1 over the voltage range 4.2 volts to 3 volts vs. Li as shown in equation (3):

$$LiCoO_2 = 0.5Li + Li_{0.5}CoO_2 \qquad (3).$$

Overcharge of Li—$LiCoO_2$ thin film cells by 20% to a composition of $Li_{0.4}CoO_2$ at 4.4 volts may significantly degrade the cycle life by about a factor of two over twenty cycles providing a loss per cycle or capacity fade of about 0.01%. However the capacity fade is significantly lower than observed for Li-$\omega Li_xV_2O_5$ cells and may have no significant effect on the cycle life of low a voltage $V_2O_5$—$LiCoO_2$ battery.

Ideally, the molar ratio of $V_2O_5$ and $LiCoO_2$ in a thin film $V_2O_5$—$LiCoO_2$ battery should equal to 0.167 in order to satisfy equations (1) and (3) and to optimize cycle life and capacity. In practice, because of the small variations in film thickness from run to run, there likely will be a small excess of either the cathode or the anode. Since the $LiCoO_2$ cathode film 22 is deposited before the $V_2O_5$ anode film 26, the thickness and therefore mass of the anode film 26 may be matched to the actual thickness of the cathode film 22 if the latter is known from profile measurements on witness samples. The following examples illustrate the theoretical operation of low voltage $V_2O_5$—$LiCoO_2$ thin film batteries according to embodiments of the disclosure. Molar fractions are given to three significant digits in order to avoid round-off error.

Balanced Electrodes

The initial charge of a $V_2O_5$—$LiCoO_2$ thin film battery in which the deposited masses of the cathode film 22 and anode film 26 allow the compositions of the anode and cathode to conform to equations (1) and (3) above, i.e. a balanced cell, is described by the following equation (4):

$$LiCoO_2 + 0.167V_2O_5 \rightarrow Li_{0.50}CoO_2 + 0.167Li_{3.0}V_2O_5 \quad (4).$$

Following the initial charge in which the anode has been converted to $\omega Li_xV_2O_5$, the first discharge half-cycle to an anode composition of $Li_{0.48}V_2O_5$ is represented by equation (5):

$$Li_{0.50}CoO_2 + 0.167Li_{3.0}V_2O_5Li_{0.92}CoO_2 + 0.167Li_{0.48}V_2O_5 \quad (5).$$

The second charge to $Li_{2.87}V_2O_5$ and following discharge to $Li_{0.48}V_2O_5$ are given by equations (6a) and (6b):

$$Li_{0.92}CoO_2 + 0.167Li_{0.48}V_2O_5Li_{0.52}CoO_2 + 0.167Li_{2.87}V_2O_5 \quad (6a)$$

and $$Li_{0.52}CoO_2 + 0.167Li_{2.87}V_2O_5 = Li_{0.92}CoO_2 + 0.167Li_{0.48}V_2O_5, \quad (6b)$$

respectively. Equation (6b) is expressed as an equality to represent successive cycles with small capacity losses.

Figure 4:
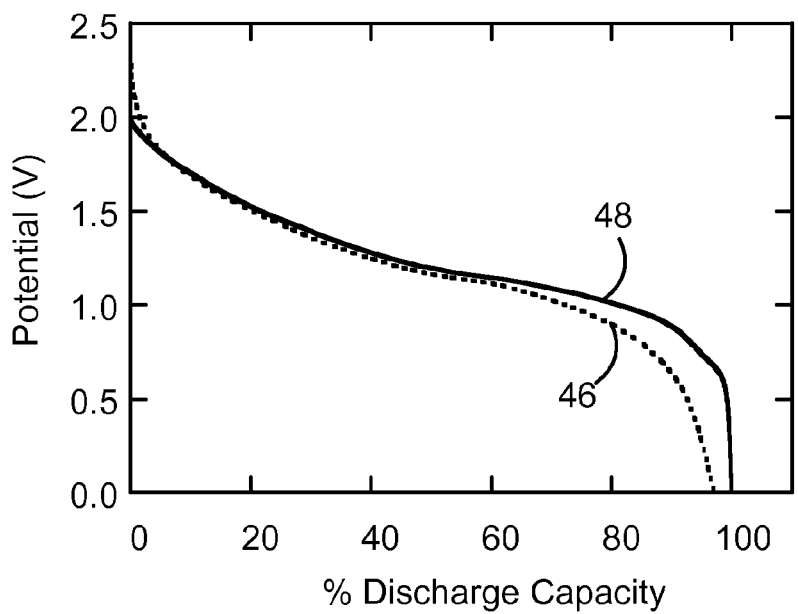
FIG. 4 is a graph of voltage potential versus discharge capacity for a lithiated anode according to the disclosure with about 20% excess anode material to cathode material.

The second discharge of a balanced thin film battery cycled at 37° C. is shown in FIG. 4 as curve 46. At a rate of C/2, about 75% of the capacity is delivered between 2.2 volts and 1.0 volt.

Excess Anode

Thin film $V_2O_5$—$LiCoO_2$ batteries may be constructed with as much as a 20% excess anode mass relative to the cathode mass without significantly degrading battery performance. The initial charge and first discharge steps are given by equations (7) and (8):

$$LiCoO_2 + 0.20V_2O_5 \rightarrow Li_{0.40}CoO_2 + 0.20Li_{3.0}V_2O_5, \quad (7)$$

and $$Li_{0.40}CoO_2 + 0.20Li_{3.0}V_2O_5Li_{0.90}CoO_2 + 0.20Li_{0.48}V_2O_5 \quad (8)$$

respectively.

The $2^{nd}$ charge and discharge half-cycles are represented by equations (9a) and (9b), $$Li_{0.90}CoO_2 + 0.20Li_{0.48}V_2O_5 \rightarrow Li_{0.42}CoO_2 + 0.20Li_{2.87}V_2O_5 \quad (9a)$$

and $$Li_{0.42}CoO_2 + 0.20Li_{2.87}V_2O_5 = Li_{0.90}CoO_2 + 0.20Li_{0.48}V_2O_5, \quad (9b)$$

respectively. The equality sign in equation (9b) represents successive cycles with small capacity losses. Because the capacity loss is largely due to lithium retention in the $\omega Li_xV_2O_5$ anode, the state of overcharge of the $LiCoO_2$ cathode diminishes with each cycle of the $V_2O_5$—$LiCoO_2$ cell.

The second discharge of a thin film $V_2O_5$—$LiCoO_2$ battery having an excess anode mass to cathode mass of about 18% is shown by the solid curve 48 in FIG. 4. At a C/3 rate, the battery may deliver 81% of its maximum capacity between 2 volts and 1 volts at 37° C. Therefore, a particularly desirable construction of a low voltage $V_2O_5$—$LiCoO_2$ thin film battery is one with an 18-20% excess anode mass relative to the cathode mass.

$LiMn_2O_4$ Cathode

The fabrication of a low voltage thin film $V_2O_5$—$LiMn_2O_4$ battery follows the same procedure descried above with replacement of the $LiCoO_2$ target by a $LiMn_2O_4$ target. The advantage in using $LiMn_2O_4$ cathode is that the battery may be cycled at elevated temperatures, for example, cycled at 175° C. The quantity of lithium that may be reversibly extracted from a $LiMn_2O_4$ thin film cathode 22 depends upon the deposition conditions and post deposition processing temperature. In one example, the charge-discharge cycles of a thin film Li—$LiMn_2O_4$ battery are represented by equation (10):

$$LiMn_2O_4 = 0.63Li + Li_{0.37}Mn_2O_4 \quad (10).$$

The initial charge of a $V_2O_5$—$LiMn_2O_4$ thin film cell with formation of $\omega Li_xV_2O_5$ may therefore be represented by equation (11):

$$LiMn_2O_4 + 0.21V_2O_5 \rightarrow Li_{0.37}Mn_2O_4 + 0.21Li_3V_2O_5 \quad (11);$$

and the first discharge half-cycle by equation (12):

$$Li_{0.37}Mn_2O_4 + 0.21Li_3V_2O_5Li_{0.90}Mn_2O_4 + 0.21Li_{0.48}V_2O_5 \quad (12).$$

The $2^{nd}$ charge half-cycle is given by equation (13a):

$$Li_{0.90}Mn_2O_4 + 0.21Li_{0.48}V_2O_5Li_{0.40}Mn_2O_4 + 0.21Li_{2.87}V_2O_5 \quad (13a);$$

and the second discharge half-cycle by equation (13b):

$$Li_{0.40}Mn_2O_4 + 0.21Li_{2.87}V_2O_5 = Li_{0.90}Mn_2O_4 + 0.21Li_{0.48}V_2O_5 \quad (13b).$$

Figure 5:
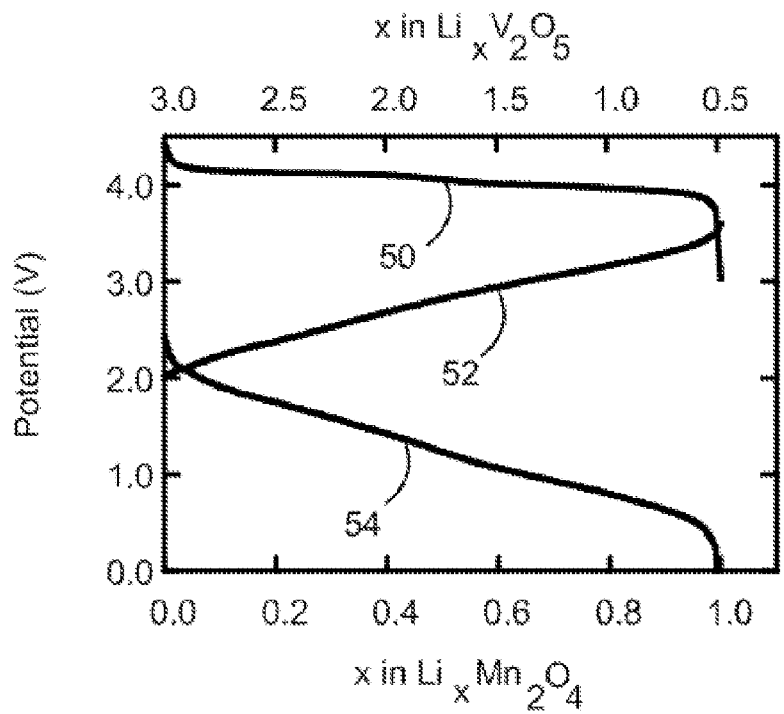
FIG. 5 is a graph of voltage potential versus anode and cathode lithium concentrations for a thin film battery according to the disclosure.

The equality sign means equation (13b) represents successive cycles with small capacity loss. A simulated discharge half-cycle of a balanced $\omega Li_xV_2O_5$—$LiMn_2O_4$ thin film battery may be provided by subtraction of curve 52 from curve 50 to provide curve 54 (FIG. 5).

From the foregoing, it will be appreciated that a thin film lithium ion battery may be constructed using the cathode annealed at an elevated temperature that delivers most of its capacity between about 2.2 volts and about 1.0 volt as opposed to prior art thin film batteries that provide most of their capacity between about 3.6 volts and about 2.0 volts.

Figure 6:
FIG. 6 is a schematic illustration of a prior art real time clock circuit for an electronic device.
Figure 6:
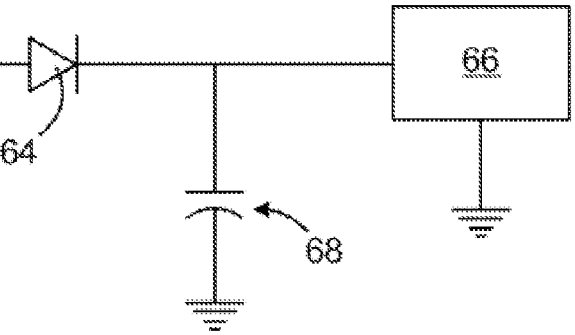

The low voltage thin film batteries described herein may have application in a wide variety of electronic devices. For example, the thin film batteries may be used as power back up for a real time clock in an electronic device. FIG. 6 illustrates a prior art real time clock circuit 60. The circuit 60 includes a main DC power source 62, a diode 64, and a real time clock 66. A capacitor 68 provides power to the real time clock 66 when the main power source 62 is turned off or disconnected.

Figure 7:
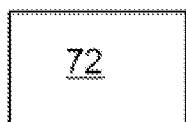
FIG. 7 is a schematic illustration of a real time clock circuit including a low voltage thin film battery according to the disclosure.
Figure 7:
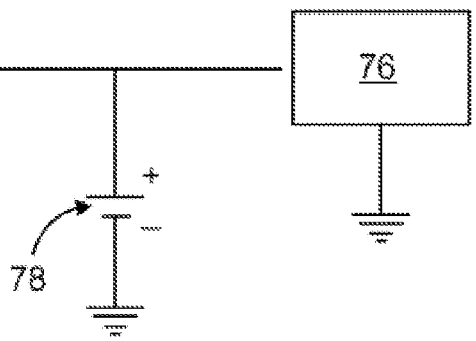

By contrast, a schematic illustration of a circuit 70 including the low voltage battery described herein is illustrated in FIG. 7. As before, the circuit 70 includes a DC power source, a diode 74 and a real time clock 76. However, in place of the capacitor 68 in circuit 60, circuit 70 includes a low voltage thin film battery 78 that may be used without a voltage regulator. The circuit 70 may be included in a wide variety of electronic devices, including, but not limited to, cellular telephones, handheld computers, and the like.

Having described various aspects, exemplary embodiments, and several advantages thereof, it will be recognized by those of ordinary skills that the disclosed embodiments are susceptible to various modifications, substitutions and revisions within the spirit and scope of the appended claims.

What is claimed is:

1. An apparatus for use as a low-voltage, thin film battery comprising:
   a ceramic substrate having a first surface and a second surface;
   a cathode current collector disposed adjacent to at least a portion of the first surface of the substrate, the current collector having a titanium layer and a gold layer;
   a high temperature annealed cathode from a radio frequency (rf) magnetron sputtered cathode target in an argon atmosphere is disposed adjacent to at least a portion of the gold cathode current collector, wherein the cathode is selected from the group consisting of $LiCoO_2$ and $LiMn_2O_4$ and the cathode is annealed at a temperature of at least 700° C.;
   an electrolyte layer disposed adjacent to the annealed cathode;
   an annealed anode disposed adjacent to at least a portion of the electrolyte, wherein the anode is electrically insulated from the cathode and the cathode current collectors by the electrolyte, and wherein the anode is derived from a lithium intercalation compound selected from the group consisting of $V_2O_5$, $TiS_2$, $MoS_2$, $MoO_{2-x}S_x$, and $MoO_3$, wherein x is between 0 and 2; and
   an anode current collector disposed adjacent to at least a portion of the anode.

2. The apparatus of claim 1, wherein the anode current collector comprises a copper film ranging from about 0.1 μm to about 0.5 μm in thickness.

3. The apparatus of claim 2, wherein the anode current collector further comprises a gold film disposed adjacent to at least a portion of the copper film, wherein the gold film ranges from about 0.1 μm to about 0.5 μm in thickness.

4. The apparatus of claim 1, further comprising a hermetic package substantially enclosing the apparatus, wherein at least a portion of the cathode current collector and at least a portion of the anode current collector are not enclosed by the hermetic package.

5. The apparatus of claim 1, wherein the anode comprises a $V_2O_5$ anode that is converted upon an initial charging of the apparatus to a $\omega Li_x V_2 O_5$ anode, wherein x is between 0 and 4.

6. The apparatus of claim 1, having an operating voltage ranging between about 2.5 volts and about 0.0 volt.

7. The apparatus of claim 1, having an operating voltage ranging between about 2.2 volts and about 1.0 volt.

8. The apparatus of claim 1, wherein the titanium layer of the cathode current collector comprises a titanium film ranging from about 0.01 μm to about 0.10 μm in thickness.

9. The apparatus of claim 1, wherein the gold layer of the cathode current collector comprises a gold film ranging from about 0.1 μm to about 0.3 μm in thickness.

10. The apparatus of claim 1, wherein the cathode comprises a film ranging from about 1 μm to about 5 μm in thickness.

11. The apparatus of claim 1, wherein the electrolyte layer comprises an amorphous lithium phosphorus oxynitride film ranging from about 0.5 μm to about 2.0 μm in thickness.

12. The apparatus of claim 1, wherein the anode comprises a film ranging from about 0.2 μm to about 2.0 μm in thickness.

13. An electronic device comprising a real time clock circuit wherein the circuit comprises the thin film battery of claim 1.

14. The electronic device of claim 13, wherein the thin film battery provides backup power for a real time clock in place of a capacitor in the electronic device.

15. A method for making low-voltage, thin film battery, comprising the steps of:
   depositing a cathode current collector on at least a portion of a first surface of a substrate, wherein the cathode current collector comprises a titanium layer adjacent to the substrate and a gold layer adjacent to the titanium layer;
   depositing a cathode film radio frequency (rf) magnetron sputtering a cathode target in an argon atmosphere on at least a portion of the gold film, wherein the cathode is selected from the group consisting of $LiCoO_2$ and $LiMn_2O_4$;
   annealing the cathode film in air at a temperature ranging from at least 700° C. to 800° C. for a period of time ranging from 10 minutes to 30 minutes;
   depositing an electrolyte layer on at least a portion of the annealed cathode;
   depositing an anode film on at least a portion of the electrolyte layer, wherein the anode is derived from a lithium intercalation compound selected from the group consisting of $V_2O_5$, $TiS_2$, $MoS_2$, $MoO_{2-x}S_x$, and $MoO_3$, wherein x is between 0 and 4;
   annealing the anode film; and
   depositing an anode current collector on at least a portion of the anode film.

16. The method of claim 15, wherein the step of annealing the anode comprises:
   prior to depositing the anode current collector on the anode film, heating the battery at a temperature ranging from about 250° to about 350° C. for a period of time ranging from about 15 minutes to about 30 minutes, while exposing the anode film to air.

17. The method of claim 15, wherein the step of depositing the anode current collector further comprises depositing a copper anode current collector film on at least a portion of the anode.

18. The method of claim 17, further comprising depositing a gold current collector film on at least a portion of the copper film.

19. The method of claim 15, wherein the step of depositing the anode film comprises rf magnetron sputtering of vanadium under a gas mixture comprising argon gas and from about 18% to 22% by volume of $O_2$, to provide a $V_2O_5$ film disposed on at least a portion of the electrolyte layer.

20. A rechargeable thin film battery made by the method of claim 15.

* * * * *